(12) United States Patent
Fontana et al.

(10) Patent No.: US 8,406,927 B2
(45) Date of Patent: Mar. 26, 2013

(54) ELECTRONIC CONTROL SYSTEM FOR DRILLING DEVICES

(75) Inventors: Pietro Fontana, Cesena (IT); Alberto Antonelli, Cesena (IT)

(73) Assignee: Soilmec S.p.A, Cesena (FC) (IT)

( * ) Notice: Subject to any disclaimer, the term of this patent is extended or adjusted under 35 U.S.C. 154(b) by 264 days.

(21) Appl. No.: 12/870,553

(22) Filed: Aug. 27, 2010

(65) Prior Publication Data

US 2011/0050453 A1  Mar. 3, 2011

(30) Foreign Application Priority Data

Aug. 28, 2009 (IT) .............................. TO2009A0667

(51) Int. Cl.
*G05B 21/00* (2006.01)

(52) U.S. Cl. ......... 700/266; 702/9; 702/250.01; 702/50; 340/539.22

(58) Field of Classification Search ............. 340/539.14; 700/266; 702/9, 250.01, 50

See application file for complete search history.

(56) References Cited

U.S. PATENT DOCUMENTS

| 5,687,091 | A | 11/1997 | Maung et al. |
| 6,216,800 | B1 | 4/2001 | Wilson et al. |
| 6,587,046 | B2 * | 7/2003 | Joao .......................... 340/539.14 |

OTHER PUBLICATIONS

Sykora et al. "The Design and Application of Redundant Programmable Controllers." *Reed Business.* vol. 29. No. 8. 1982. pp. 77-79.

* cited by examiner

*Primary Examiner* — Arnold Kinkead

(74) *Attorney, Agent, or Firm* — Merchant & Gould P.C.

(57) ABSTRACT

An electronic control system for drilling devices, includes at least one pair of data-processing units (2a, 2b); a plurality of data-exchange lines, connected to the data-processing units (2a, 2b) for transmission of signals from and to control devices (4a-4c) of the drilling device; and accessories (5, 9) proper to the drilling device. Each of the data-processing units (2a, 2b) is redundant by the others with one and the same level of hierarchy, and all the data-processing units (2a, 2b) are connected to all the control devices (4a-4c) and to the accessories (5, 9) proper to the drilling device through the electronic data-exchange lines that are redundant in a number equal to the multiplicity of the data-processing units (2a, 2b).

15 Claims, 1 Drawing Sheet

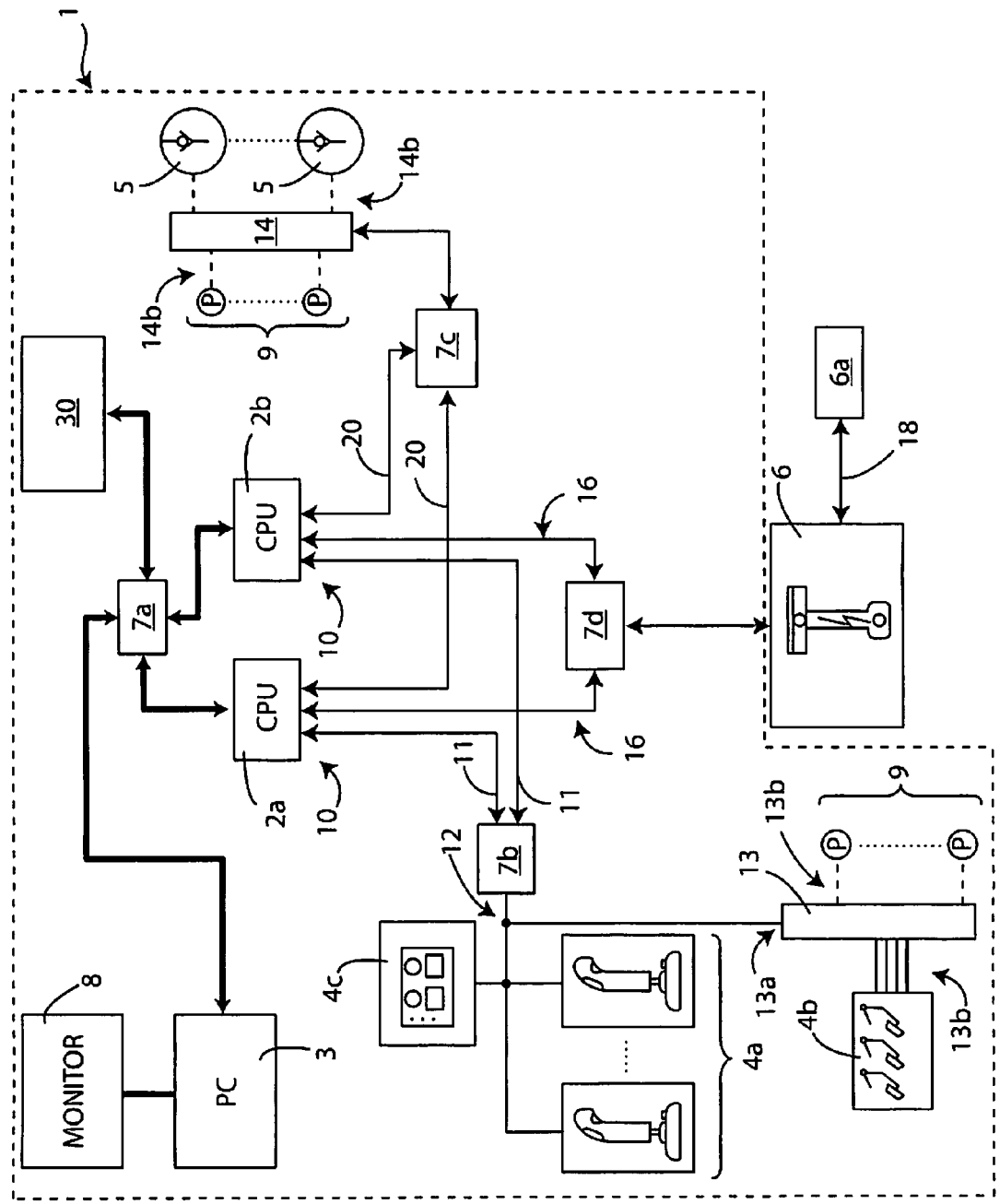

ELECTRONIC CONTROL SYSTEM FOR DRILLING DEVICES

This application claims benefit of Serial No. TO2009A000667, filed 28 Aug. 2009 in Italy and which application is incorporated herein by reference. To the extent appropriate, a claim of priority is made to the above disclosed application.

BACKGROUND

The present invention relates to the field of electronic control systems and in particular relates to an electronic control system for drilling devices.

It is known that drilling devices are complex machines equipped with numerous accessories that co-operate with one another. Typically, said accessories are managed or controlled by a user responsible for operation of the drilling device, who must be able to access at least the display of operating parameters of the various components (for example, pressure, operating depth, failures, etc.).

There are known control systems of an electronic type with the capacity for displaying the data and with the capacity for interaction with some accessories of the controlled device. Said systems are built in such a way as to adapt to particular types of accessories and are configured via hardware and/or via software so as to adapt procedures, algorithms, and internal operation on the basis of the type of component controlled.

Said control systems have redundancy provided by other control systems, typically manual ones, which even in the case of failure or breakdown enable prosecution of the operativeness of the drilling device.

Electronic control systems of a known type have certain drawbacks.

When a component of the system, for example a sensor, an accessory, or a control device fails, this has to be replaced in order not to alter the functions of the machine. For obvious economic reasons, it is necessary for the replacement to be made and the machine to be set again in operation in the shortest time possible. Both in the case where the accessories controlled by the electronic system are replaced with identical products and, above all when they are replaced with different brands or models, they need to be reprogrammed and it is required the intervention of a skilled technician or very complex instructions.

Furthermore, they are provided with redundant other systems, typically with other mechanical systems. Even though this makes it possible to proceed with the drilling activities, it causes considerable down times for replacement of the electronic system and frequently causes a loss of data and/or operating parameters useful for monitoring and deferred analysis of the progress of the excavation.

Furthermore, the electronic control systems of a known type are all the more complex the greater the complexity of the controlled drilling device; frequently, this causes a considerable complexity of use for the user, in particular, given the current tendency to concentrate as many functions as possible no longer under a direct mechanical control on the part of the user (for example, via control levers), but within the electronic control system itself, which then actuates the various components through servomechanisms.

Finally, electronic control systems of a known type do not enable optimization of control of the intervals of maintenance of the drilling device controlled by them.

In addition, in drilling systems of a traditional type, it is not possible to increase the MTTF (Mean Time To Failure) of digging accessories by mere redundancy. In particular, this applies to the components of the system such as control devices and sensors. For example, in the case of drilling machines, it would be inappropriate to make available in the cab several pairs of joysticks connected up in a redundant way, of which one is operative and the other is disabled until the other joystick of the pair fails. In addition to the obvious problems of space, this choice would cause uncertainties for the operator and risks for his safety.

SUMMARY

The purpose of the present invention is to disclose an electronic control system for drilling devices that will be free from the drawbacks described above and that will enable isolation of the fault, in addition to identifying it easily in order to limit the effects thereof to a restricted number of functions of the operating machinery.

BRIEF DESCRIPTION OF THE DRAWINGS

The invention will now be described with reference to the annexed drawings, which illustrate a non-limiting example of embodiment thereof, where FIG. 1 shows a first block diagram of an electronic control system for drilling devices according to the present invention.

With reference to FIG. 1, the reference number 1 designates as a whole an electronic control system for drilling devices. As is known, device 1 enables control of a plurality of accessories or applications (milling cutters, buckets, air compressors, pumps for liquids, etc.), including their corresponding sensors and actuators, typically installed on the drilling devices.

DETAILED DESCRIPTION

System 1 comprises:
- a first data-processing unit 2a, redundant by a second data-processing unit 2b set in parallel to the first one, i.e., with one and the same level of hierarchy, and in which both first data-processing unit 2a and second data-processing unit 2b are preferably control units with a respective CPU or else PLC or ASIC;
- an electronic data-management unit 3 (preferably a computer or a PLC), having a plurality of input/output ports and exchanging electronic data with first and second data-processing units 2a, 2b; data-management unit 3 is not redundant by data-processing units 2a, 2b; and
- a plurality of control devices 4a, 4b, 4c for controlling operation of a drilling device (not illustrated in the figures).

As illustrated in detail in FIG. 1, control devices 4a, 4b, 4c enable control of a plurality of electrically or electronically controlled valves 5, which control, for example, linear actuators (for instance, hydraulic or electric pistons) or more actuation of rotary actuators (for instance, hydraulic or electric motors); in addition, said control devices enable exchange of electronic data with a control system for an endothermic motor 6 of the drilling device.

As already mentioned, data-management unit 3 is connected up and exchanges data via a wired Ethernet connection line both with first data-processing unit 2a and with second data-processing unit 2b, through a first switch 7a. For convenience of representation and of comprehensibility of the annexed FIGURE, the Ethernet connections are represented with a solid line.

In particular, switch 7a has four or more ports, one of which is directly connected to data-management unit 3, whilst the remaining two are connected, once again through an Ethernet cable, each to the respective first/second data-processing unit 2a, 2b. In this way, data-management unit 3 can exchange data simultaneously with both of the data-processing units 2a, 2b.

Data-management unit 3 is moreover connected to a monitor 8. In detail, said monitor may also be of a touch-screen type, and is hence able not only to present images representing operating parameters of the drilling device and/or of its accessories but also to perform an active function on the drilling device. In this case, in fact, a user can enter commands for operation of the drilling device directly from monitor 8 itself.

Data-management unit 3 has within it a memory containing, in addition to the normal files and data necessary for operation of its I/O ports and services, also:

operating data and parameters of a wide range of models of accessories and tools typical of drilling devices (also of ones not installed); as well as video files or equivalent means for instructing the personnel responsible for using the device itself, regarding ordinary maintenance operations to be carried out on the drilling device.

On the one hand, the operating data and parameters of typical accessories and devices installed on the drilling devices enable adaptation of system 1 to the control of accessories that are produced by a number of different manufacturers. On the other hand, the video files for routine maintenance can be recalled by the user whenever necessary, in such a way that he can immediately verify and learn maintenance operations without any need to move away from the drilling device itself.

As represented schematically in FIG. 1, first and second data-processing units 2a, 2b are electrically connected and exchange data with control devices 4a, 4b, 4c, the solenoid valves 5, and pressure transducers 9 through CANs (Controller Area Networks), represented in FIG. 1 with a thin line in such a way as to be differentiated from the Ethernet lines, which are represented by the solid line.

In detail, each of the two data-processing units 2a, 2b comprises a plurality of CAN ports 10, one of which, for each of the two data-processing units 2a, 2b, is respectively connected to a second switch 7b, this time operating with technology, modulation, and data transmission of CAN type in such a way as to be adaptable to the CAN itself. Second switch 7b has two ports connected to a CAN line 11 directed towards first and second data-processing units 2a, 2b, respectively, and a third port connected to a node 12. Connected to node 12 are control devices 4a, 4b, 4c.

In the embodiment described herein, said control devices 4a, 4b, 4c comprise:

a plurality of joysticks 4a;

a control panel 4c, which is equipped with a plurality of pushbuttons and switches for management and control of the applications of system 1; and a plurality of pedals 4b for controlling operation of the drilling device and with a plurality of pressure transducers 9, which are electrically connected to node 12 through a concentration node 13 of CAN lines.

In detail, concentration node 13 comprises a concentration port 13a facing node 12, and a plurality of ports 13b for connection to sensors or actuators and, moreover, to the plurality of pedals 4b; to each of the connection ports to sensors or actuators there corresponds a respective line for interchange of data with the sensors and actuators. The interchange lines are represented in FIG. 1 by dashed lines. Through concentration node 13 it is consequently possible to concentrate all the data-interchange lines on a single CAN line.

Each of the two data-processing units 2a, 2b possesses a respective port connected—through a CAN line 20 of its own—to a third switch 7c, at a first port and a second port of its own. Third switch 7c moreover has a third port connected to a concentration node 14, identical to concentration node 13 in terms of operation. Concentration node 14 has respective connection ports 14b connected to valves 5 via a data-interchange lines of its own and to pressure transducers 9.

Clearly, the configuration illustrated in FIG. 1 is not to be understood as in any way limiting, given that connection ports 13b, 14b of concentration nodes 13, 14 can be connected to other devices.

Finally, system 1 comprises a fourth switch 7d, having a first port and a second port connected to first and second data-processing units 2a, 2b, respectively, on a respective CAN line 16, and, moreover, a third port connected to, and exchanging data with, the electronic control system of the endothermic motor 6 of the drilling device.

Connected to endothermic motor 6 is an electrical ignition panel 6a, through a dedicated ignition line 18. Consequently, control and respectively display of the data of endothermic motor 6 is entrusted to data-processing units 2a, 2b and to data-management unit 3.

This arrangement enables isolation of all the possible problems of endothermic motor 6 by intervening in feedback thereon to carry out checks and calibrations. For example, when first data-processing unit 2a, 2b fails, and the second (back-up) unit steps in, the system could intervene on endothermic motor 6 to reduce the power thereof or bring it to a minimum r.p.m. that will enable the operator to complete the drilling operation in safety, minimizing the risks of blocking also second data-processing unit 2b. In fact, first data-processing unit 2a could have failed on account of an excessively high temperature; if this temperature were not reduced, also second data-processing unit 2b could fail for the same reason, in a short time. It is hence extremely important to be able to intervene on endothermic motor 6, through a single control line, so as to have direct warnings of a possible fault of this fundamental component.

The fact that each of switches 7a-7d is connected to both of data-processing units 2a, 2b through a CAN line of its own, enables creation of a full redundancy of operation of all the devices and applications connected to the data-processing units themselves.

In fact, data-processing units 2a, 2b each possess a capacity of detection of the fault of the other data-processing units and, in addition, the capacity to detect a failure or interruption of CAN lines 11-13.

Under normal conditions, i.e., where no failures are present, alternatively first data-processing unit 2a or second data-processing unit 2b can function; typically, in this case, one of two data-processing units 2a, 2b effectively operates, whilst the other remains in a condition of control of the first, ready to intervene in the case of any malfunctioning.

In the case where one of the two data-processing units 2a, 2b or one of the CAN lines comprised between data-processing units 2a, 2b and switches 7a-7d fails, the data-processing unit that is "sound" or the one with the CAN lines not interrupted automatically detects the fault, and an alarm signal is sent to the user. The latter can then choose to interrupt the operation of the drilling device or activate a control of switching to the other data-processing unit, which, in this case, takes over management of the operation of all the applications and of the devices connected thereto. In fact, each control device 4a, 4b, 4c is connected, between the respective switch and data-processing units 2a, 2b through two physically distinct CAN lines, a first one of which is directed towards first data-processing unit 2a and a second of which is directed, instead, towards second data-processing unit 2b.

System 1 is moreover equipped with a self-learning function, via which it is possible to replace accessories and applications of the drilling device without any need for a long manual reconfiguration of the system itself.

In detail, the replacement of accessories and applications on the drilling device can cause changes in the type, for example, of valves 16 and/or pressure transducers 9.

Upon an event of installation of a new accessory or application on the drilling device, data-processing unit 2a or 2b notices the replacement and sends a request signal to data-management unit 3 through first switch 7a. Third data-processing unit 3 hence receives the instructions for the recognition of the new accessory or application installed, looks within a memory of its own for the accessory installed, and:
  if said accessory is known, assigns to the two data-processing units 2a, 2b purposely provided data-interchange parameters in such a way as to be able to interpret correctly the signals transmitted thereto through the CAN lines; and
  if said accessory is not instead amongst the ones present in the memory on data-management unit 3, an alert message is sent on monitor 8.

In the memory of third data-management unit 3 there can also be stored one or more standard operating procedures, which are commonly executed by the operator of the drilling device. In detail, in fact, frequently the operators of the drilling devices find themselves having to perform identical operations repeatedly during the period of use of the drilling device.

Via a control of acquisition of an automated procedure, the operator of the drilling device can—by acting on control devices 4a-4c of system 1—execute a first time an operating procedure and subsequently recall it via a single control set for example on one of joysticks 4a or by typing on monitor 8 (if this is a touch screen).

System 1 moreover enables assignment (or configuration) adapted to the user of at least part of the commands for controlling the drilling device on various control devices 4a-4c. The assignment adapted to the user enables, for example, left-handed and right-handed users to invert given commands of the drilling device, to the advantage of the ease of use of the device itself.

Each user has available a function of assignment of the commands, managed by data-management unit 3. Prior to the use of the drilling device, the user can program data-management unit 3 by choosing the arrangement of the commands (which can be translated from one control device 4a-4c to the other) that he prefers. The procedure of assignment of the commands can be specified for a number of different users and it can be recalled at subsequent times by each of them. Consequently, each user of the drilling device on which system 1 is mounted can have a configuration of commands of his own created ad hoc. In the case, instead, where the user does not opt for a configuration of commands adapted to his particular needs, data-management unit 3 envisages in any case a standard arrangement of the various commands on multiple control devices 4a-4c of system 1.

In the case of failure, the user of the drilling device can recall from computer or PLC 3 one or more video that are represented on monitor 8; through said video he can acquire instructions for executing routine maintenance operations on the drilling device.

Finally, data-management unit 3 can be connected to the Internet or to terrestrial or satellite radio communications systems external to the drilling device in such a way as to enable the user of the drilling device to interact and exchange messages with the manufacturing company of the drilling device in order to check, for example, the parts or components to be replaced in the case of failure, highlighting times of supply, price of the component, etc. Said connection is made thanks to an electronic radio communication stage 30, electrically connected to and exchanging data with first switch 7a.

The advantages of the system so far described emerge clearly in the light of the foregoing description. In particular, it enables operation in a condition of constant redundancy and prevents blocking of the drilling device in the case of breakdown. In fact, both the lines that connect to switch 7a-7d and data-processing units 2a, 2b are redundant in equal number. Consequently, the only failure that is able to undermine operation of the drilling device is the failure of one of the lines downstream of switch 7a, 7d.

In other words, the redundancy such as to prevent malfunctioning in the drilling device is guaranteed both by the fact that data-processing units 2a, 2b connected to all the control devices 4a-4c and to accessories and sensors 5, 9 of said drilling device are more than one and by the fact that said data-processing units 2a, 2b are connected thereto through electronic data-exchange lines redundant in a number equal to the multiplicity of data-processing units 2a, 2b.

Clearly, a potential failure of one of the lines downstream of the aforesaid switch would cause only a malfunctioning of a part of the electrical circuit, maintaining operation of the remaining parts of the circuit itself.

In particular, in fact, in the case of malfunctioning or failure of a part of the electrical circuit, the switch upstream of the area of electrical circuit that is not functioning isolates the failure, leaving operation of the remaining parts of the electrical circuit unaltered. For example, connection of endothermic motor 6 to the control system via fourth switch 7d enables isolation of possible malfunctioning thereof without altering the other functions of the drilling device. Consequently, in order to reduce the areas of electrical circuit subject to malfunctioning in the case of failure, it is useful to increase the number of switches, which will hence each control a smaller multiplicity of control devices of the drilling device.

The capacity for self-configuration of system 1 is extremely useful during installation and maintenance of the accessories, given that it reduces the times and costs of intervention on the drilling device and likewise renders the system flexible, i.e., capable of being installed on numerous different types of drilling devices, provided that the accessories mounted on them are known to the memory of data-management unit 3.

For this reason, the presence of data-management unit 3 is of fundamental importance both to enable the capacity for adaptation to devices or accessories not installed on the drilling device (and possibly also produced by different manufacturers, provided that they produce pieces compatible with the device itself) and to enable management of the diversification of the configuration of the commands thereof.

Only with the combination of the two characteristics described above is it possible to provide a reliable and inexpensive control device. It is necessary, in fact, to increase as much as possible the degree A of operativeness of the machine. In detail, the degree A is expressed in percentage terms by the ratio between MTTF and MTBF (Mean Time Between Failures). MTBF is the sum of MTTF and MTTR (Mean Time To Repair).

Expressed as a formula, $$A = MTTF/MTBR = MTTF/(MTTF+MTTR)$$

In order to maximize A, it is necessary to increase MTTF or else reduce MTTR.

The control system described comprises many components, which are different from one another as regards nature and function. Data-processing unit 2a, 2b, which is the core of the system, can rarely be repaired and entails a very long replacement time. The simplest solution is hence to apply the concept of redundancy so as to reduce the MTTF of the data-processing assembly of which the two data-processing units 2a, 2b form part.

In other words, the two data-processing units 2a, 2b are configured with mutual connections that reduce the aforesaid MTTF following upon a failure occurring to one of the two units themselves.

As already mentioned in the introductory part of the present description, since it is not possible to increase the MTTF of components such as controls (e.g., joysticks) or sensors by means of redundancy it is necessary to reduce the MTTR.

When one of these components fails, it is replaced. Thanks to the information stored in memory 3, the system recognizes the spare part that has just been installed and automatically reconfigures itself, adapting to its technical characteristics of communication and operation. This enables the replacement operation to be speeded up drastically. Furthermore, said replacement can be performed by non-specialized technicians since it does not require particular skills for reprogramming the software of the system. The wait times on the site for arrival of said personnel are thus eliminated.

In this way, a highly reliable control system is obtained, which enables reduction of the times of inoperativeness of the machine and reduces the costs of repair.

Furthermore, the configurability of the controls and commands according to the requirements of the user, renders the drilling device more user friendly and increases the safety thereof, given that each user can, if he so wishes, adapt the arrangement of at least part of the controls and commands so as to allocate them on the preferred control device, thus improving the ergonomics thereof.

In addition, the presence of explanatory video regarding maintenance of the drilling device in data-management unit 3 also enables reduction of the times and costs of intervention on the device itself for standard and/or programmed maintenance operations.

Finally, it is clear that variations, modifications, and improvements may be made to the system illustrated herein, which are obvious to the person skilled in the art, without thereby departing from the sphere of protection as specified in the annexed claims.

For example, it is clear that alongside the first and second data-processing units there can be set also other data-processing units, which perform the same functions, operations, and routines, in such a way as to increase further the capacity of redundancy of the system forming the subject of the present invention. In this case, obviously, the switches of the system will have a number of ports forming the data-processing units equal to the number of data-processing units themselves.

The same concept can be extended also to the data-management unit, which may also have redundancy.

Furthermore, it is clear that, if the drilling device has a number of endothermic motors, the system forming the subject of the present invention enables control of all of them. For this reason, the presence in the annexed FIGURE as well as in the description of a single endothermic motor 6 is not to be considered as in any way limiting.

Finally, the data-management unit can be equipped with input/output ports for connection of external storage devices (such as, for example, without being limited thereto, external USB or HD keys), which contain data-interchange parameters for the accessories that can be installed on the drilling device.

The external storage devices mentioned above can be directly connected to the data-management unit or, alternatively, to a further port of the first switch.

The invention claimed is:

1. Electronic control system for drilling devices, said system comprising:
    a plurality of data-processing units;
    a plurality of data-exchange lines, connected to said data-processing units for the transmission of signals from and to:
    a plurality of control devices of said drilling device;
    a plurality of accessories for the drilling device;
    an electronic data-management unit, electrically connected to said plurality of data-processing units; the data-management unit comprising a memory stored in which there are at least one of information and operating parameters of said accessories and each of the units of said plurality of data-processing units is redundant by the other data-processing units at a same level of hierarchy.

2. System according to claim 1, wherein all the data-processing units are connected to all the control devices and to the accessories of said drilling device through said electronic data-exchange lines redundant in number equal to the plurality of said data-processing units.

3. System according to claim 1, further comprising a plurality of switches; said switches being connected to said data-processing units with said control devices, to said devices of the drilling device, and to said data-management unit; each of the switches having:
    a first port connected through a data-transmission line to said data-management unit, said control devices, and said devices of the drilling device, respectively; and
    a plurality of ports, different from said first port, each connected to one of the data-processing units.

4. System according to claim 3, wherein said plurality of data-processing units is connected to said data-management unit through a first switch, and wherein said devices of said drilling device are connected to said data-processing units through a second switch and a third switch.

5. System according to claim 2, wherein said plurality of data-processing units is connected to, and exchanges data with, at least one endothermic motor of said drilling device.

6. System according to claim 3, wherein said plurality of data-processing units has a respective port for said connection to, and exchange of data with, said endothermic motor, and wherein said endothermic motor is electrically connected to said plurality of data-processing units via a fourth switch.

7. System according to claim 1, wherein said control devices are configurable by the user in a number of different configurations that comprise at least:
    a first, standard, configuration; and
    a second configuration, in which at least some of said control devices of said devices are subject to an assignment different from said first standard configuration;
    said assignment being managed by said data-management unit.

8. System according to claim 7, wherein said assignment is managed automatically from said data-management unit by said information contained in the memory of said data-management unit.

9. System according to claim 1, further comprising a plurality of concentration nodes adapted to concentrate a number of data-transmission lines directly connected to said control devices of the drilling device of a single transmission line.

10. System according to claim 2, wherein said data-management unit comprises input/output ports for the connection of external storage devices, which contain data-interchange parameters for the accessories that can be installed on said drilling device.

11. System according to claim 7, wherein said data-management unit further comprises storage means, which contain video representations of instructions for the use and maintenance of the drilling device and of instructions for the choice of the preferred configuration of the control devices that are replaced.

12. System according to claim 10, further comprising an image-display or monitor device, electrically connected to said data-management unit; said monitor showing to a user:
- said video representations of instructions; and/or
- operating parameters of said drilling device and/or of its accessories.

13. System according to claim 11, wherein said monitor is a touch-screen.

14. System according to claim 3, further comprising an electronic radio communication stage; said electronic radio communication stage being electrically connected to, and exchanging data with, the first switch.

15. System according to claim 1, wherein the two data-processing units are configured with mutual connections that reduce a mean time to failure following upon a failure that has occurred on a unit of said plurality of data-processing units.

* * * * *